(12) United States Patent
Chiproot

(10) Patent No.: US 9,145,971 B2
(45) Date of Patent: Sep. 29, 2015

(54) HYDRAULIC GASKET FOR COUPLING

(71) Applicant: Avi Chiproot, Kfar-Saba (IL)

(72) Inventor: Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 23 days.

(21) Appl. No.: 13/870,203

(22) Filed: Apr. 25, 2013

(65) Prior Publication Data

US 2014/0319781 A1    Oct. 30, 2014

(51) Int. Cl.
    *B29C 45/00*    (2006.01)
    *F16J 15/02*    (2006.01)
    *B29D 99/00*    (2010.01)
    *F16L 17/035*    (2006.01)

(52) U.S. Cl.
    CPC ........... *F16J 15/022* (2013.01); *B29C 45/0001* (2013.01); *B29D 99/0085* (2013.01); *F16L 17/035* (2013.01)

(58) Field of Classification Search
    CPC ..................... B29D 99/0085; F16J 15/022
    See application file for complete search history.

(56) References Cited

U.S. PATENT DOCUMENTS

| 1,867,891 A | * | 7/1932 | Reynolds | ............ 277/616 |
| 2010/0001521 A1 | * | 1/2010 | Vandal et al. | ......... 285/337 |
| 2011/0266754 A1 | * | 11/2011 | Krausz et al. | ......... 277/605 |

FOREIGN PATENT DOCUMENTS

| GB | 1462886 |   | 1/1977 |
| GB | 1462886 A | * | 1/1977 |
| WO | 2010/080742 |   | 7/2010 |

OTHER PUBLICATIONS

PCT Written Opinion and Search PCT/US2014/035063, Sep. 2, 2014.

* cited by examiner

*Primary Examiner* — Ryan Ochylski
(74) *Attorney, Agent, or Firm* — Dekel Patent Ltd.; David Klein

(57) ABSTRACT

A method for making a gasket including molding an elastomeric material in a mold to form a gasket that includes an outer portion folded over an inner portion so as to define an inner annular space between and bounded by the outer and inner portions, and wherein one or more apertures are formed in a side wall of the gasket, which are in fluid communication with the inner annular space.

7 Claims, 2 Drawing Sheets

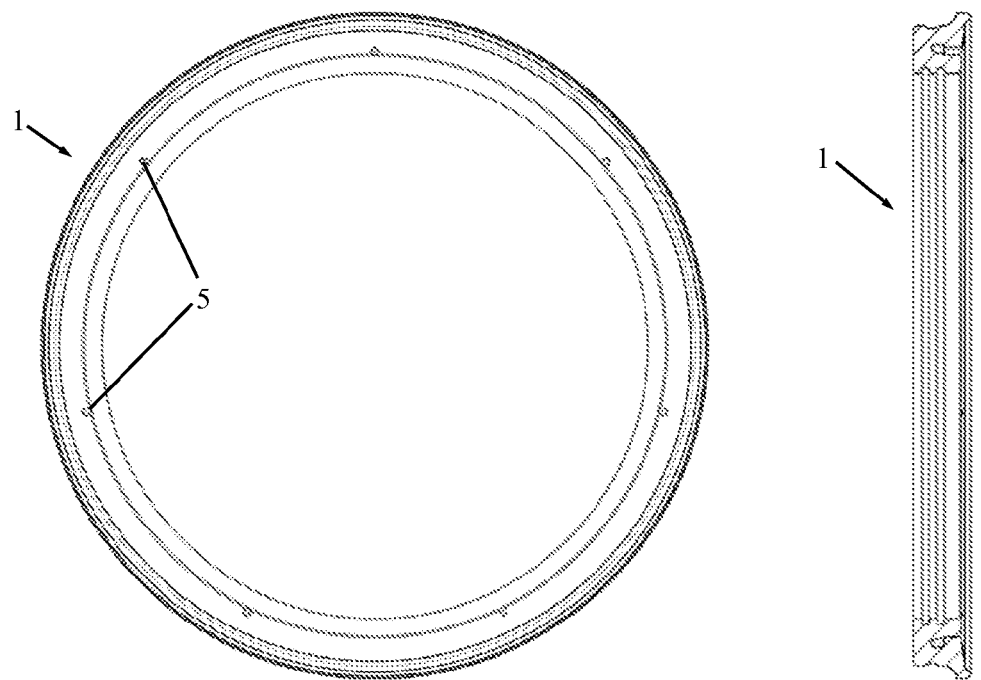
FIG. 1A
PRIOR ART
FIG. 1B
PRIOR ART
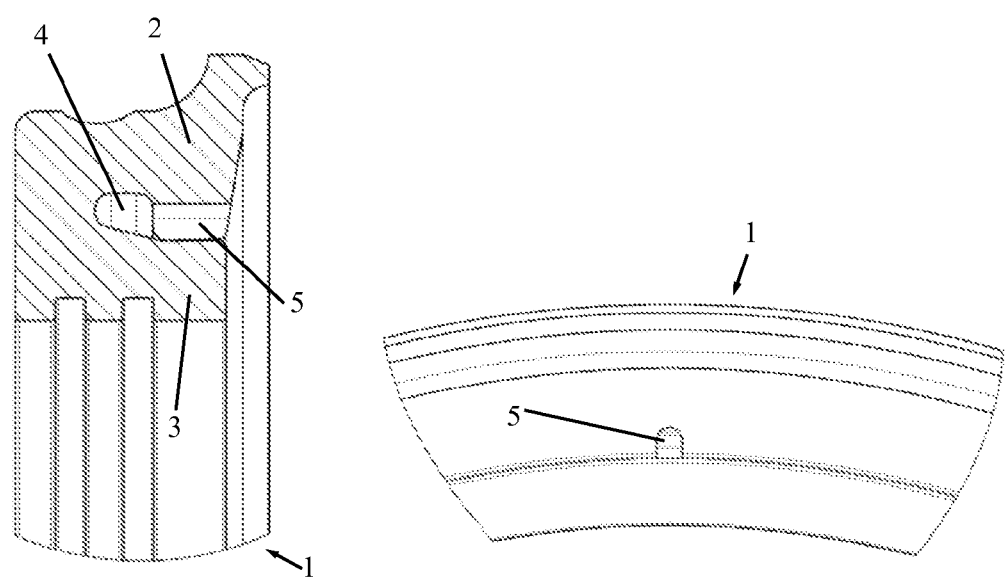
FIG. 1C
PRIOR ART
FIG. 1D
PRIOR ART

HYDRAULIC GASKET FOR COUPLING

FIELD OF THE INVENTION

The present invention relates generally to couplings or clamps and grip rings for pipes, and particularly to a molded hydraulic gasket for a coupling or clamp.

BACKGROUND OF THE INVENTION

Many kinds of removable band-type couplings for pipes exist in the art. It is noted that throughout the specification and claims, the term "pipe" encompasses any kind of generally cylindrical object.

FIGS. 1A-1D illustrate a prior art gasket (seal, the terms being used interchangeably) for a pipe coupling, namely, the HYMAX GRIP 7″ gasket (198-230) LW, from Krausz Industries Ltd., Israel. The gasket has a ring shaped hydraulic seal 1 made of rubber or other resilient material. As seen best in FIG. 1C, seal 1 includes an outer portion 2 (also called "fin") folded over an inner portion 3 so as to define an inner annular space 4 between and bounded by the outer and inner portions 2 and 3. The inner annular space 4 is in fluid communication with a fluid (e.g., water, not shown) flowing in a pipe sealed by the seal 1. The fluid enters inner annular space 4 via apertures 5 formed in a side wall of seal 1 (seven such apertures 5 are shown in the drawing). The fluid applies pressure in inner annular space 4 to increase tightening of the seal. The apertures 5 have two end faces: one end face is open to the outer side wall of seal 1 and the other end face is open to the inner annular space 4.

The hydraulic seal 1 is constructed in the prior art from a long rubber strip (such as a length of 25 meters). The long strip is cut to the size of the desired circumference and the hydraulic inner space is formed by drilling holes in the rubber. The cut rubber strip is then formed into a ring.

It is known in the prior art to form sealing rings by molding the rubber or other elastomer, such as by injection molding. However, it is not heretofore known to make the seals with the hydraulic inner space 4 by molding, because such an inner space of the prior art does not lend itself to molding, such as injection molding.

SUMMARY OF THE INVENTION

The present invention seeks to provide an improved molded hydraulic gasket for a clamp, as is described more in detail hereinbelow. The gasket can be made by injection molding of a suitable elastomer and significantly reduces manufacturing costs.

There is thus provided in accordance with an embodiment of the present invention a method for making a gasket including molding an elastomeric material in a mold to form a gasket that includes an outer portion folded over an inner portion so as to define an inner annular space between and bounded by the outer and inner portions, and wherein one or more apertures are formed in a side wall of the gasket, which are in fluid communication with the inner annular space.

BRIEF DESCRIPTION OF THE DRAWINGS

The present invention will be understood and appreciated more fully from the following detailed description, taken in conjunction with the drawing in which:

FIGS. 1A-1D are simplified illustrations, respectively of end-view, central cross-section showing inner annular space and fluid apertures, detail of cross-section, and detail of end-view showing fluid apertures, of a prior art gasket for a pipe coupling.

DETAILED DESCRIPTION OF EMBODIMENTS

Reference is now made to FIGS. 2A-2D, which illustrate a hydraulic gasket 10, constructed and operative in accordance with a non-limiting embodiment of the present invention.

Figures 2A, 2B:
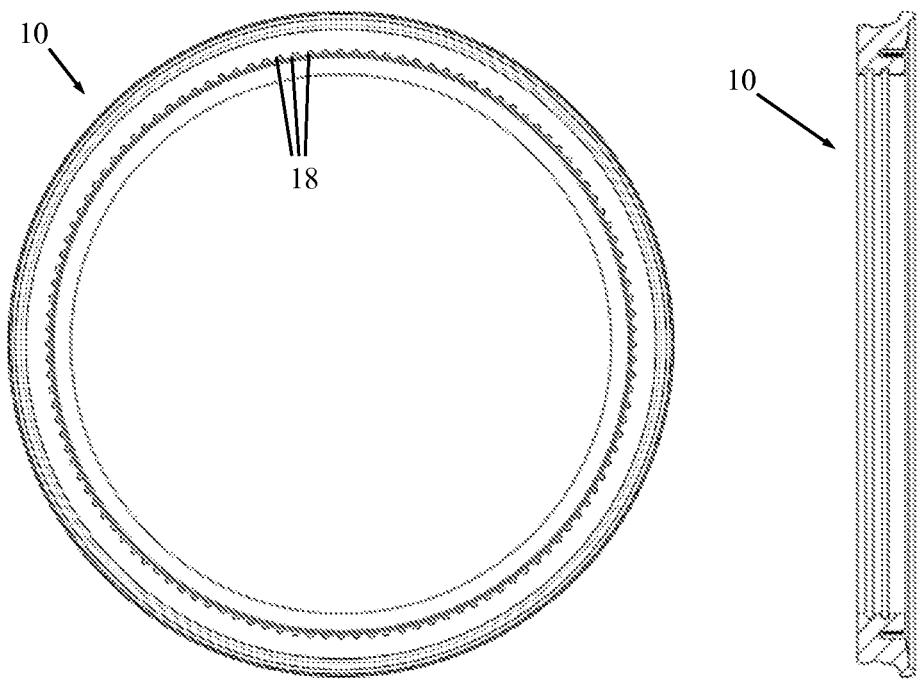
FIGS. 2A-2D are simplified illustrations, respectively of end-view, central cross-section showing inner annular space and fluid apertures, detail of cross-section, and detail of end-view showing fluid apertures, of a gasket for a pipe coupling, constructed and operative in accordance with a non-limiting embodiment of the present invention.
Figures 2C, 2D:
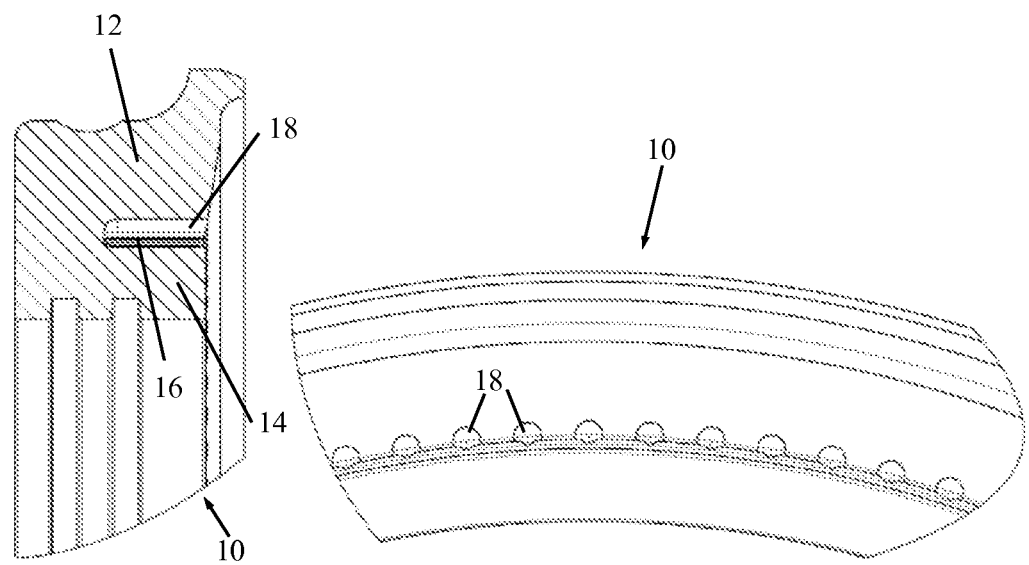

Gasket 10 includes an outer portion ("fin") 12 folded over an inner portion 14 so as to define an inner annular space 16 between and bounded by the outer and inner portions 12 and 14 (seen best in FIG. 2C). The inner annular space 16 is in fluid communication with a fluid (e.g., water, not shown) flowing in a pipe sealed by gasket 10. The fluid enters inner annular space 16 via one or more apertures 18 formed in a side wall of gasket 10. The fluid applies pressure in inner annular space 16 to increase tightening of the seal. In contrast with the prior art, apertures 18 do not fluidly communicate from an end face to the inner annular space 16. Instead, most or all of the length (depth) of apertures 18 overlies inner annular space 16. Accordingly, apertures 18 fluidly communicate along their length with inner annular space 16. It is also seen that apertures 18 are wider than the inner annular space 16.

Gasket 10 is made by molding an elastomeric material, such as but not limited to, a rubber (e.g., EPDM (ethylene propylene diene monomer), butyl, styrene butadiene or neoprene) or a thermoplastic elastomer (e.g., polyurethane or olefin) compatible with the fluid to be carried in the pipe. For example, without limitation, gasket 10 may be made of EPDM rubber with 70-80 Shore A durometer. The preferred molding is injection molding, but the invention may be carried out with other types of molding processes, such as compression molding and transfer molding.

The molding process allows for good tolerance control and for a substantially increased number of apertures 18 that were possible in the prior art. In one embodiment, there are 50 or more apertures 18. In another embodiment, there are 100 or more apertures 18 (in the illustrated embodiment there are 120 apertures 18).

In the molded seal, the inner annular space 16 and the apertures 18 are formed with a radius at their deep ends. The apertures 18 overlie the inner annular space 16. The inner annular space 16 may have a width of just 1 mm; the apertures 18 may have a diameter of just 3 mm (the invention is not limited to these values).

The scope of the present invention includes both combinations and subcombinations of the features described hereinabove as well as modifications and variations thereof which would occur to a person of skill in the art upon reading the foregoing description and which are not in the prior art.

What is claimed is:

1. A method for making a gasket comprising:
   molding an elastomeric material in a mold to form a gasket that comprises an outer portion folded over an inner portion so as to define an inner annular space between and bounded by said outer and inner portions, and wherein one or more apertures are formed in a side wall of said gasket, which are in fluid communication with said inner annular space, wherein said apertures do not fluidly communicate from an end face of said gasket to said inner annular space, and most or all of a length of said apertures overlies said inner annular space and said apertures fluidly communicate along their length with said inner annular space and said apertures are wider than said inner annular space.

2. The method according to claim 1, wherein said molding comprises injection molding.

3. The method according to claim 1, wherein said elastomeric material comprises a rubber or a thermoplastic elastomer.

4. The method according to claim 3, wherein said rubber comprises EPDM (ethylene propylene diene monomer), butyl, styrene butadiene or neoprene.

5. The method according to claim 3, wherein said thermoplastic elastomer comprises polyurethane or olefin.

6. The method according to claim 1, wherein there are 50 or more said apertures.

7. The method according to claim 1, wherein there are 100 or more said apertures.

* * * * *